United States Patent
He et al.

(10) Patent No.: US 7,435,504 B2
(45) Date of Patent: Oct. 14, 2008

(54) PLATINUM, TUNGSTEN, AND NICKEL OR ZIRCONIUM CONTAINING ELECTROCATALYSTS

(75) Inventors: Ting He, Dublin, OH (US); Eric Rolland Kreidler, Pickerington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 11/210,761

(22) Filed: Aug. 25, 2005

(65) Prior Publication Data

US 2007/0049490 A1    Mar. 1, 2007

(51) Int. Cl.
*H01M 4/00* (2006.01)
*B01J 23/00* (2006.01)
*C22C 27/00* (2006.01)
*C22C 32/00* (2006.01)
*C22C 30/00* (2006.01)

(52) U.S. Cl. ............ 429/44; 502/308; 502/313; 502/315; 420/432; 420/580

(58) Field of Classification Search ......... 423/579–643; 502/300, 305, 308, 313; 429/40, 12, 44; 420/432, 580

See application file for complete search history.

(56) References Cited

U.S. PATENT DOCUMENTS

| | | | |
|---|---|---|---|
| 3,481,787 A | 12/1969 | Adlhart | |
| 3,506,494 A | 4/1970 | Adlhart | |
| 3,645,860 A | 2/1972 | Fishman et al. | |
| 3,856,876 A | 12/1974 | Burnett | |
| 4,126,934 A | 11/1978 | Richter et al. | |
| 4,186,110 A | 1/1980 | Jalan et al. | |
| 4,192,907 A | 3/1980 | Jalan et al. | |
| 4,232,097 A | 11/1980 | Shanks et al. | |
| 4,311,569 A | 1/1982 | Dempsey et al. | |
| 4,457,824 A | 7/1984 | Dempsey et al. | |
| 4,513,094 A | 4/1985 | Luczak | |
| 4,528,083 A | 7/1985 | LaConti et al. | |
| 4,705,610 A | 11/1987 | Tenhover et al. | |
| 4,707,229 A | 11/1987 | Dempsey et al. | |
| 4,746,584 A | 5/1988 | Tenhover et al. | |
| 4,781,803 A | 11/1988 | Harris et al. | |
| 4,826,795 A | 5/1989 | Kitson et al. | |
| 4,868,073 A | 9/1989 | Hashimoto et al. | |
| 4,937,220 A | 6/1990 | Nickols, Jr. | |
| 5,013,618 A | 5/1991 | Luczak | |
| 5,068,161 A | 11/1991 | Keck et al. | |
| 5,298,343 A | 3/1994 | Savadogo et al. | |
| 5,922,488 A | 7/1999 | Marucchi-Soos et al. | |
| 2001/0027160 A1 | 10/2001 | Lee et al. | |
| 2003/0059666 A1 | 3/2003 | Kourtakis | |
| 2004/0013601 A1 | 1/2004 | Butz et al. | |
| 2004/0072061 A1 | 4/2004 | Nakano et al. | |
| 2004/0121219 A1 | 6/2004 | Mei et al. | |
| 2005/0037920 A1 | 2/2005 | Devennev et al. | |

FOREIGN PATENT DOCUMENTS

| | | |
|---|---|---|
| EP | 0 450 849 A2 | 10/1991 |
| EP | 0 653 242 A1 | 5/1995 |
| EP | 0 838 872 A2 | 4/1998 |
| GB | 2242203 A | 9/1991 |
| WO | WO 03/071621 A2 | 8/2003 |
| WO | WO 03/083963 A2 | 10/2003 |
| WO | WO 2004/109829 A1 | 12/2004 |

OTHER PUBLICATIONS

Gotz, M. and Wendt, H. "Binary and ternary anode catalyst formulations including the elements W, Sn and Mo for PEMFCs operated on methanol or reformate gas", Electrochimica Acta, vol. 43, No. 24, pp. 3637-3644 (1998), Elsevier Science, Ltd.

Shim, J.; Yoo, D. and Lee, J., "Characteristics for electrocatalytic properties and hydrogen-oxygen adsorption of platinum ternary alloy catalysts in polymer electrolyte fuel cell", Electrochimica Acta, vol. 45, pp. 1943-1951 (2000), Elsevier Science, Ltd.

*Primary Examiner*—Steven Bos
*Assistant Examiner*—Anthony J Zimmer
(74) *Attorney, Agent, or Firm*—Samuel P. Burkholder; Mark E. Duell

(57) ABSTRACT

The present teachings are directed toward electrocatalyst compositions of alloys of platinum, tungsten and one of either of nickel or zirconium for use in fuel cells. The alloys consists essentially of platinum present in an atomic percentage ranging between about 20 percent and about 45 percent, tungsten present in an atomic percentage ranging between about 30 percent and about 70 percent, and one of either nickel present in an atomic percentage ranging between about 5 percent and about 25 percent, or zirconium present in an atomic percentage ranging between about 5 percent and about 40 percent.

10 Claims, No Drawings

PLATINUM, TUNGSTEN, AND NICKEL OR ZIRCONIUM CONTAINING ELECTROCATALYSTS

BACKGROUND

1. Field of the Invention

The present teachings relate to thin film fuel cell electrocatalysts and catalyst compositions comprising alloys consisting essentially of platinum, tungsten, and one of either nickel or zirconium with platinum present in an atomic percentage no greater than about 45 percent.

2. Discussion of the Related Art

The desire to reduce the amount of expensive platinum group metals needed to obtain a desired level of performance for an electrocatalyst is an ever present operational parameter for the design of many operations involving electrocatalysts.

Enhancement of catalyst performance by alloying platinum with various less expensive metals is one of the possible avenues to either reduce the amount of platinum required, or perhaps increase the efficiency of the catalyzed reaction, or both. For instance, the cathode reaction of a typical proton exchange membrane fuel cell ("PEMFC") can utilize an electrode containing a platinum-based catalyst to drive the Oxygen reduction reaction.

A need exists for thin film fuel cell electrocatalysts and electrocatalyst compositions that reduce the amount of platinum needed to achieve a desired performance level.

SUMMARY

The present teachings satisfy the need for electrocatalyst compositions with lower platinum amounts, particularly for fuel cell electrocatalysts, and especially for thin film fuel cell electrocatalysts.

In one aspect, the present teachings include an electrocatalyst composition including a metal alloy consisting essentially of platinum, tungsten and nickel, or a metal alloy consisting essentially of platinum, tungsten and zirconium. The alloys can contain platinum present at an atomic percentage up to no greater than about 45 percent, and tungsten present at an atomic percentage ranging from between about 30 percent and about 70 percent. In the platinum, tungsten and nickel containing alloy, the nickel can be present at an atomic percentage ranging from between about 5 percent and about 25 percent. In the platinum, tungsten and zirconium containing alloy, the zirconium can be present at an atomic percentage ranging from between about 5 percent and about 40 percent.

In another aspect, a fuel cell electrocatalyst comprising a composition consisting essentially of a metal alloy of platinum, tungsten, and one of either nickel or zirconium are provided. The alloys can contain platinum at an atomic percentage up to no greater than about 45 percent, and tungsten at an atomic percentage ranging between about 30 percent and about 70 percent. In the platinum, tungsten and nickel containing alloys, the nickel can be present at an atomic percentage ranging from between about 5 percent and about 25 percent. In the platinum, tungsten and zirconium containing alloys, the zirconium can be present at an atomic percentage ranging from between about 5 percent and about 40 percent.

The present teachings further include a fuel cell assembly comprising at least one thin film electrocatalyst, a membrane, and at least one electrode. The thin film electrocatalyst comprises a composition consisting essentially of a metal alloy of platinum, tungsten, and one of either nickel or zirconium. The thin film electrocatalyst alloy can contain platinum at an atomic percentage up to no greater than about 45 percent, and tungsten at an atomic percentage ranging between about 30 percent and about 70 percent. In the platinum, tungsten and nickel containing thin film electrocatalyst alloy, the nickel can be present at an atomic percentage ranging from between about 5 percent and about 25 percent. In the platinum, tungsten and zirconium containing thin film electrocatalyst alloy, the zirconium can be present at an atomic percentage ranging from between about 5 percent and about 40 percent.

In yet another aspect, the present teachings include a fuel cell assembly comprising at least one supported electrocatalyst, a membrane, and at least one electrode. The supported electrocatalyst can comprise a powder composition consisting essentially of a metal alloy of platinum, tungsten, and one of either nickel or zirconium supported on a high surface area support material. According to the present teachings, the supported electrocatalyst can be a supported nanoparticle-containing powder. The supported electrocatalyst alloy can contain platinum at an atomic percentage up to no greater than 45 percent, and tungsten at an atomic percentage ranging between about 30 percent and about 70 percent. In the platinum, tungsten and nickel containing supported electrocatalyst alloy, the nickel can be present at an atomic percentage ranging from between about 5 percent and about 25 percent. In the platinum, tungsten and zirconium containing supported electrocatalyst alloy, the zirconium can be present at an atomic percentage ranging from between about 5 percent and about 40 percent.

DETAILED DESCRIPTION

The present teachings relate to an electrocatalyst composition including a metal alloy consisting essentially of platinum, tungsten and one of either nickel or zirconium.

The electrocatalyst metal alloy composition of the present teachings can be a platinum, tungsten and nickel alloy containing platinum present at an atomic percentage ranging between about 20 percent and about 45 percent, tungsten present at an atomic percentage ranging between about 30 percent and about 70 percent, and nickel present at an atomic percentage ranging between about 5 percent and about 25 percent.

The electrocatalyst metal alloy composition of the present teachings can be a platinum, tungsten and zirconium alloy containing platinum present at an atomic percentage ranging between about 20 percent and about 45 percent, tungsten present at an atomic percentage ranging between about 30 percent and about 70 percent, and zirconium present at an atomic percentage ranging between about 5 percent and about 40 percent.

An electrocatalyst composition including a metal alloy consisting essentially of platinum, tungsten, and nickel is also provided. In one embodiment, the platinum can be present in the alloy at an atomic percentage ranging between about 20 percent and about 45 percent, tungsten can be present in an atomic percentage ranging between about 30 percent and about 70 percent, and nickel can be present in an atomic percentage ranging between about 5 and about 25 percent.

The electrocatalyst composition alloy can include platinum in an atomic percentage ranging between about 20 percent and about 40 percent, or ranging between about 30 percent and about 40 percent. According to the present teachings, the electrocatalyst composition alloy can include tungsten in an atomic percentage ranging between about 35 percent and about 55 percent, or can include an alloy with tungsten present in an atomic percentage ranging between about 36 percent and about 47 percent. The electrocatalyst composition alloy can include nickel in an atomic percentage ranging between about 15 percent and about 25 percent, or can include an alloy with nickel present in an atomic percentage ranging between about 18 percent and about 25 percent.

According to the present teachings, the platinum, tungsten, and zirconium-containing electrocatalyst composition alloy can include platinum in an atomic percentage ranging between about 20 percent and about 45 percent, tungsten in an atomic percentage ranging between about 30 percent and about 70 percent, and can include zirconium in an atomic percentage ranging between about 5 percent and about 40 percent.

Additional embodiments of the platinum, tungsten and zirconium containing electrocatalyst composition alloy can include platinum in an atomic percentage ranging between about 30 percent and about 40 percent, or ranging between about 35 percent and about 39 percent, tungsten in an atomic percentage ranging between about 30 percent and about 45 percent, or ranging between about 30 percent and about 40 percent, and can include zirconium in an atomic percentage ranging between about 15 percent and about 35 percent, or ranging between about 22 percent and about 34 percent.

Also provided is a thin film electrocatalyst composed from an electrocatalyst composition alloy according to the present teachings, the alloys can contain essentially platinum, tungsten, and one of either nickel or zirconium. For the platinum, tungsten, and nickel containing thin film electrocatalysts, platinum can be present in the alloy at an atomic percentage ranging between about 20 percent and about 45 percent, tungsten can be present in an atomic percentage ranging between about 30 percent and about 70 percent, and nickel can be present in an atomic percentage ranging between about 5 percent and about 25 percent.

Thin film platinum, tungsten, and zirconium-containing electrocatalysts according to the present teachings can contain platinum in an atomic percentage ranging between about 20 percent and about 45 percent, tungsten in an atomic percentage ranging between about 30 percent and about 70 percent, and zirconium in an atomic percentage ranging between about 5 percent and about 40 percent.

The electrocatalyst can be a supported nanoparticle-containing powder. The nanoparticles present in the supported powder can range in size from about 0.5 nm to about 100 nm, and can be composed of an alloy of platinum, tungsten, and one of either of nickel or zirconium.

According to the present teachings, a fuel cell electrocatalyst is provided. The fuel cell electrocatalyst can include a composition consisting essentially of an alloy of platinum, tungsten, and one of either nickel or zirconium. For the platinum, tungsten, and nickel alloy, platinum can be present in the alloy at an atomic percentage ranging between about 20 percent and about 45 percent, tungsten can be present in an atomic percentage ranging between about 30 percent and about 70 percent, and nickel can be present in an atomic percentage ranging between about 5 percent and about 25 percent.

The platinum, tungsten, and zirconium-containing fuel cell electrocatalysts can contain platinum in an atomic percentage ranging between about 20 percent and about 45 percent, tungsten in an atomic percentage ranging between about 30 percent and about 70 percent, and zirconium in an atomic percentage ranging between about 5 percent and about 40 percent.

The electrocatalyst can be a thin film, a supported powder, or a supported nanoparticle-containing powder. The electrocatalyst can be supported on a support, such as high surface area carbon, or unsupported.

The thin film fuel cell electrocatalyst can be prepared by physical vapor deposition. The physical vapor can be plasma generated by a suitable means, for example, plasma guns. Further examples of deposition methods include, for instance, ion plating, ion implantation, evaporation, and laser surface alloying.

The thin film fuel cell electrocatalyst can be prepared by simultaneous deposition of the platinum metal, the tungsten metal, and one of either of nickel metal or zirconium metal. Alternatively, the thin film fuel cell electrocatalyst can be prepared by non-simultaneous or sequential deposition of the three metals of the electrocatalyst composition.

A fuel cell assembly including a thin film electrocatalyst, a membrane, and an electrode which can be different from the thin film electrocatalyst is provided. The thin film electrocatalyst can be composed of a composition consisting essentially of an alloy of platinum, tungsten and one of either nickel or zirconium metals.

The thin film electrocatalyst of the fuel cell assembly can be composed of an alloy containing essentially platinum present in an atomic percentage ranging between about 20 percent and about 45 percent, tungsten present in a corresponding atomic percentage ranging between about 30 percent and about 70 percent, and nickel present in a corresponding atomic percentage ranging between about 5 percent and about 25 percent. Furthermore, the thin film electrocatalyst of the fuel cell assembly can include platinum in an atomic percentage ranging between about 20 percent and about 40 percent, or platinum present in an atomic percentage ranging between about 30 percent and about 40 percent. The thin film electrocatalyst of the fuel cell assembly can include tungsten in an atomic percentage ranging between about 35 percent and about 55 percent, or tungsten present in an atomic percentage ranging between about 36 and about 47 percent. The thin film electrocatalyst of the fuel cell assembly can include nickel in an atomic percentage ranging between about 15 percent and about 25 percent, or nickel present in an atomic percentage ranging between about 18 percent and about 25 percent.

In yet another embodiment, the thin film electrocatalyst of the fuel cell assembly can be composed of an alloy containing essentially platinum present in an atomic percentage ranging between about 20 percent and about 45 percent, tungsten present in a corresponding atomic percentage ranging between about 30 percent and about 70 percent, and zirconium present in a corresponding atomic percentage ranging between about 5 percent and about 40 percent. Furthermore, the thin film electrocatalyst of the fuel cell assembly can include platinum in an atomic percentage ranging between about 30 percent and about 40 percent, or platinum present in an atomic percentage ranging between about 35 percent and about 39 percent. The thin film electrocatalyst of the fuel cell assembly can include tungsten in an atomic percentage ranging between about 30 percent and about 45 percent, or tungsten present in an atomic percentage ranging between about 30 percent and about 40 percent. The thin film electrocatalyst of the fuel cell assembly can include zirconium in an atomic percentage ranging between about 15 percent and about 35 percent, or zirconium present in an atomic percentage ranging between about 22 percent and about 34 percent.

The thin film electrocatalyst can be the cathode of a PEMFC and can drive the oxygen reduction reaction of the PEMFC.

A thin film can be a film of thickness ranging from nanometers to micrometers thick and prepared by physical vapor deposition, electrochemical plating, or ink coating of the desired components onto a suitable substrate. One possible means of producing the desired thin film is physical vapor deposition. Physical vapor deposition refers to the deposition of the components from component vapors generated through, for instance, heat, plasma, and electron beams. The deposition of the components can occur simultaneously, which is referred to as co-deposition, or sequentially. A suitable preparation method is described in pending U.S. patent application Ser. No. 10/757,302 filed Jan. 14, 2004.

A fuel cell assembly including a supported electrocatalyst, a membrane, and at least one electrode which can be different from the supported electrocatalyst is provided. The supported electrocatalyst can be composed of a powder composition consisting essentially of an alloy of platinum, tungsten, and one of either nickel or zirconium.

The powder composition can be prepared by any suitable preparation method, for instance, wet chemical methods. The powder can be supported on a suitable high surface area support. The high surface area support can be, for instance, carbon or alumina. High surface area refers to supports with surface areas of at least about 100 m$^2$/g.

In one embodiment, the supported electrocatalyst can be composed of an alloy containing essentially platinum present in an atomic percentage ranging between about 20 percent and about 45 percent, tungsten present in a corresponding atomic percentage ranging between about 30 percent and about 70 percent, and nickel present in a corresponding atomic percentage ranging between about 5 percent and about 25 percent. Furthermore, according to the present teachings, the supported electrocatalyst can include platinum in an atomic percentage ranging between about 20 percent and about 40 percent, or platinum present in an atomic percentage ranging between about 30 percent and about 40 percent. According to the present teachings, the supported electrocatalyst can include tungsten in an atomic percentage ranging between about 35 percent and about 55 percent, or tungsten present in an atomic percentage ranging between about 36 percent and about 47 percent. The supported electrocatalyst can include nickel in an atomic percentage ranging between about 15 percent and about 25 percent, or nickel present in an atomic percentage ranging between about 18 and about 25 percent.

According to yet another embodiment, the supported electrocatalyst can be composed of an alloy containing essentially platinum present in an atomic percentage ranging between about 20 percent and about 45 percent, tungsten present in a corresponding atomic percentage ranging between about 30 percent and about 70 percent, and zirconium present in a corresponding atomic percentage ranging between about 5 percent and about 40 percent. Furthermore, according to the present teachings, the supported electrocatalyst can include platinum in an atomic percentage ranging between about 30 percent and about 40 percent, or platinum present in an atomic percentage ranging between about 35 percent and about 39 percent. The supported electrocatalyst can include tungsten in an atomic percentage ranging between about 30 percent and about 45 percent, or tungsten present in an atomic percentage ranging between about 30 percent and about 40 percent. The supported electrocatalyst can include zirconium in an atomic percentage ranging between about 15 percent and about 35 percent, or zirconium present in an atomic percentage ranging between about 22 percent and about 34 percent.

The tungsten, nickel and zirconium components of the various alloys of the present teachings can be partially oxidized. The oxidized tungsten, nickel and zirconium can be present at or on the alloy surface. As used herein, tungsten refers to both oxidized and metallic tungsten located anywhere in a tungsten-containing alloy, nickel refers to both oxidized and metallic nickel located anywhere in a nickel-containing alloy, and zirconium refers to both oxidized and metallic zirconium located anywhere in a zirconium-containing alloy.

The atomic percentages set forth herein were determined by EDX analysis of the thin film electrocatalyst compositions after evaluation by rotating disc electrode as detailed in the Examples.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Platinum, Tungsten and Nickel

Thin film samples of varying platinum, tungsten, and nickel alloy composition were prepared by physical vapor deposition of plasma generated metal vapors. A suitable preparation method is described in pending U.S. patent application Ser. No. 10/757,302 filed Jan. 14, 2004.

The activity levels for the oxygen reduction reaction of the platinum, tungsten, and nickel alloy electrocatalysts were electrochemically screened using a hydrodynamic rotating disc electrode (RDE) apparatus, which is capable of screening numerous material compositions simultaneously. A suitable screening method is described in pending U.S. patent application Ser. No. 10/713,242 filed Nov. 14, 2003.

Thin film samples of alloy were coated onto 5 mm diameter glassy carbon electrodes. Following electrochemical cleaning, the samples were then used as the working electrodes in oxygen reduction reaction cells, and the results are presented in Table 1.

In Table 1, the atomic percentages of the platinum, tungsten and nickel metals are tabulated. The potentials at half current maximum ($E_{1/2}$) in mV, both absolute and relative to pure platinum thin film, are also presented. The mass-fraction-based activity (A) relative to pure platinum thin film at both 0.7 V and 0.8 V for each sample is presented in Table 1. The mass-fraction-based kinetic current, $I_k$, in mA/mf Pt at both 0.7 V and 0.8 V were calculated from polarization curves and are presented in Table 1.

The results indicate an unexpected performance with alloys containing metal loadings of between about 20 atomic percent and about 45 atomic percent platinum, between about 30 atomic percent and about 70 atomic percent tungsten, and between about 5 atomic percent and about 25 atomic percent nickel. The alloyed compositions according to the present teachings had unexpectedly higher mass-fraction-based activity levels than an unalloyed pure platinum electrocatalyst.

Platinum, Tungsten and Zirconium

Thin film samples of varying platinum, tungsten, and zirconium alloy composition were prepared by physical vapor deposition of plasma generated metal vapors. A suitable preparation method is described in pending U.S. patent application Ser. No. 10/757,302 filed Jan. 14, 2004.

The activity levels for the oxygen reduction reaction of the platinum, tungsten and zirconium alloy electrocatalysts were electrochemically screened using a hydrodynamic rotating disc electrode (RDE) apparatus, which is capable of screening numerous material compositions simultaneously. A suitable screening method is described in pending U.S. patent application Ser. No. 10/713,242 filed Nov. 14, 2003.

Thin film samples of alloy were coated onto 5 mm diameter glassy carbon electrodes. Following electrochemical cleaning, the samples were then used as the working electrodes in oxygen reduction reaction cells, and the results are presented in Table 2.

In Table 2, the atomic percentages of the platinum, tungsten and zirconium metals are tabulated. The potentials at half current maximum ($El_{1/2}$) in mV, both absolute and relative to pure platinum thin film, are also presented. The mass-fraction-based activity (A) relative to pure platinum thin film at both 0.7 V and 0.8 V for each sample is presented in Table 2. The mass-fraction-based kinetic current, $I_k$, in mA/mf Pt at both 0.7 V and 0.8 V were calculated from polarization curves and are presented in Table 2.

The results indicate an unexpected performance with alloys containing metal loadings of between about 20 atomic percent and about 45 atomic percent platinum, between about 30 atomic percent and about 70 atomic percent tungsten, and between about 5 atomic percent and about 40 atomic percent zirconium. The alloyed compositions according to the present teachings had unexpectedly higher mass-fraction-based activity levels than an unalloyed pure platinum electrocatalyst.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

TABLE 1

| Composition | | | Relative | | | Absolute | | |
|---|---|---|---|---|---|---|---|---|
| Pt | W | Ni | $\Delta E_{1/2}$(mV) | A(0.7 V) | A(0.8 V) | $E_{1/2}$(mV) | $I_K$(0.7 V) | $I_K$(0.8 V) |
| 1.00 | 0.00 | 0.00 | 0.0 | 1.0 | 1.0 | 745.2 | 2.45968 | 0.33968 |
| 0.41 | 0.49 | 0.10 | 31.2 | 4.0 | 3.9 | 776.4 | 9.89297 | 1.31733 |
| 0.40 | 0.45 | 0.14 | 28.8 | 3.8 | 3.6 | 774.0 | 9.44498 | 1.22375 |
| 0.40 | 0.40 | 0.21 | 67.4 | 7.7 | 8.5 | 812.6 | 19.05286 | 2.89535 |
| 0.39 | 0.44 | 0.18 | 33.1 | 4.4 | 4.0 | 778.3 | 10.79946 | 1.34738 |
| 0.39 | 0.36 | 0.25 | 75.5 | 10.0 | 10.3 | 820.7 | 24.49835 | 3.49302 |
| 0.35 | 0.55 | 0.10 | 29.8 | 5.0 | 4.2 | 775.0 | 12.25977 | 1.41779 |
| 0.35 | 0.47 | 0.18 | 59.9 | 9.0 | 8.3 | 805.1 | 22.23956 | 2.80263 |
| 0.33 | 0.47 | 0.20 | 65.6 | 10.7 | 9.9 | 810.8 | 26.28340 | 3.35739 |
| 0.32 | 0.54 | 0.14 | 32.4 | 5.7 | 4.8 | 777.7 | 13.93209 | 1.63816 |
| 0.31 | 0.45 | 0.24 | 60.4 | 9.9 | 9.0 | 805.6 | 24.26129 | 3.04961 |
| 0.26 | 0.66 | 0.09 | 20.2 | 4.7 | 4.9 | 765.4 | 11.47842 | 1.65163 |
| 0.25 | 0.54 | 0.21 | 44.2 | 7.6 | 7.8 | 789.4 | 18.72151 | 2.63985 |
| 0.24 | 0.63 | 0.13 | 18.0 | 4.8 | 4.7 | 763.3 | 11.79079 | 1.59932 |
| 0.24 | 0.60 | 0.16 | 36.6 | 6.8 | 7.2 | 781.8 | 16.80299 | 2.45914 |
| 0.23 | 0.52 | 0.25 | 44.9 | 8.0 | 8.2 | 790.1 | 19.62604 | 2.79790 |

TABLE 2

| Composition | | | Relative | | | Absolute | | |
|---|---|---|---|---|---|---|---|---|
| Pt | W | Zr | $\Delta E_{1/2}$(mV) | A(0.7 V) | A(0.8 V) | $E_{1/2}$(mV) | $I_K$(0.7 V) | $I_K$(0.8 V) |
| 1.00 | 0.00 | 0.00 | 0.0 | 1.0 | 1.0 | 738.6 | 2.07001 | 0.28814 |
| 0.41 | 0.49 | 0.10 | 41.5 | 5.3 | 5.1 | 780.1 | 11.06252 | 1.47074 |
| 0.40 | 0.44 | 0.16 | 58.7 | 8.5 | 7.5 | 797.3 | 17.59118 | 2.17005 |
| 0.39 | 0.40 | 0.22 | 63.5 | 10.0 | 8.5 | 802.1 | 20.67761 | 2.45728 |
| 0.38 | 0.34 | 0.28 | 66.9 | 10.6 | 9.2 | 805.5 | 21.87852 | 2.64177 |
| 0.35 | 0.31 | 0.34 | 63.8 | 10.1 | 8.7 | 802.5 | 20.88499 | 2.51027 |
| 0.33 | 0.56 | 0.11 | 32.2 | 5.5 | 5.0 | 770.8 | 11.33502 | 1.43052 |
| 0.32 | 0.52 | 0.16 | 37.9 | 6.5 | 5.7 | 776.5 | 13.36205 | 1.64889 |
| 0.31 | 0.47 | 0.22 | 36.9 | 6.3 | 5.6 | 775.6 | 13.04895 | 1.60235 |
| 0.31 | 0.39 | 0.30 | 54.8 | 8.7 | 8.0 | 793.4 | 18.03459 | 2.30892 |
| 0.29 | 0.36 | 0.36 | 44.1 | 7.2 | 6.4 | 782.8 | 14.95243 | 1.83583 |
| 0.24 | 0.64 | 0.11 | 18.3 | 5.1 | 5.1 | 756.9 | 10.46605 | 1.45590 |
| 0.24 | 0.59 | 0.17 | 20.4 | 5.2 | 5.2 | 759.0 | 10.71472 | 1.50330 |
| 0.23 | 0.55 | 0.23 | 14.7 | 4.8 | 4.4 | 753.4 | 9.90309 | 1.27113 |
| 0.22 | 0.50 | 0.29 | 18.9 | 5.3 | 5.1 | 757.5 | 10.88590 | 1.45722 |
| 0.21 | 0.41 | 0.38 | 25.9 | 5.8 | 5.6 | 764.6 | 12.10436 | 1.62061 |

What we claim is:

1. An electrocatalyst composition consisting essentially of: a metal alloy consisting essentially of platinum, tungsten, and zirconium,
   wherein the platinum is present in an atomic percentage ranging between about 20 percent and about 45 percent, tungsten is present in an atomic percentage ranging between about 30 percent and about 70 percent, and zirconium is present in an atomic percentage ranging between about 5 percent and about 40 percent.

2. The electrocatalyst composition according to claim 1, wherein the platinum is present in an atomic percentage ranging between about 30 percent and about 40 percent.

3. The electrocatalyst composition according to claim 1, wherein the tungsten is present in an atomic percentage ranging between about 30 percent and about 45 percent.

4. The electrocatalyst composition according to claim 1, wherein the zirconium is present in an atomic percentage ranging between about 15 percent and about 35 percent.

5. A thin film electrocatalyst consisting of the electrocatalyst composition according to claim 1.

6. A fuel cell assembly comprising:
   an electrocatalyst,
   a membrane, and
   an electrode;
   wherein the electrocatalyst comprises a composition consisting essentially of a metal alloy consisting essentially of platinum, tungsten, and zirconium, and wherein platinum is present in an atomic percentage ranging between about 20 percent and about 45 percent, tungsten is present in an atomic percentage ranging between about 30 percent and about 70 percent, and zirconium is present in an atomic percentage ranging between about 5 percent and about 40 percent.

7. The fuel cell assembly according to claim 6, wherein the platinum is present in an atomic percentage ranging between about 30 percent and about 40 percent.

8. The fuel cell assembly according to claim 6, wherein the tungsten is present in an atomic percentage ranging between about 30 percent and about 45 percent.

9. The fuel cell assembly according to claim 6, wherein the zirconium is present in an atomic percentage ranging between about 15 percent and about 35 percent.

10. The fuel cell assembly according to claim 6, wherein the electrocatalyst comprises a thin film electrocatalyst.

* * * * *